Patented Dec. 2, 1941

2,264,574

UNITED STATES PATENT OFFICE 2,264,574

PROCESS FOR THE PRODUCTION OF PREPARED CEREAL FOODS

John L. Kellogg, Chicago, Ill.

No Drawing. Application December 11, 1939,
Serial No. 308,558

3 Claims. (Cl. 99—82)

This invention relates to the treatment of corn (maize) for the production of puffs.

One of the objects of the invention is to provide, in the case of cooked and puffed corn, a novel treatment of the cereal before it is cooked, which consists in introducing water into the cereal and causing the water, preferably by agitation and tempering to uniformly penetrate the material. The amount of water used is preferably between 10% and 50% on the weight of the cereal. As a result of this treatment, several advantages accrue, for example: the flavor and texture of the puffs, including their crispness in their finally processed state, are improved and, particularly, the possibility of raw centers is obviated; the degree of cooking or dextrinization may be better controlled; the cooking time may be shortened, which saves expense and gives a larger vitamin content in the final product; the amount of water for cooking may be materially reduced, which makes possible the elimination, partly or wholly, of the usual drying step precedent to puffing; and where flavoring is used, i. e., salt, sugar, malt extract or other flavoring substance, whether introduced in the water absorption step or in the cooking step, or partly in one and partly in the other, the flavor cooks into and permeates the material more uniformly and satisfactorily than is the case when the cereal is cooked without the precedent water absorption step and the flavoring introduced at the cooking stage.

If desired, part of the water can be introduced in the cooking step in which case the precedent penetration of the cereal by the other portion of the water will facilitate penetration during cooking and accomplish applicant's purpose at least partially.

Flavoring material may be added during the water absorption treatment, or during the cooking step, or between these steps.

The water absorption treatment can be carried out with water at tap temperatures or with warm water, below a cooking temperature, say up to 170° F., which is to be preferred as the absorption is hastened at the higher temperatures.

A further object of the invention, applicable particularly to yellow corn, whether cooked or not, is to improve the flavor of prepared food products made from this cereal by subjecting the cereal to contact with steam, before giving it the other desired treatment or treatments. Yellow corn is desirable as a material for prepared or breakfast food because of its cheapness and high vitamin content; but it has not been utilized successfully for this purpose because of its strong or "corny" taste and odor. Treated according to this part of the present invention, yellow corn in the form of puffs makes a very acceptable food.

After this treatment the yellow corn may be subjected to the water absorption treatment and to cooking, as will be more particularly described hereinafter; or it may be subjected, with or without cooking and with or without the water absorption treatment, to any other treatment that may be required, dependent on the character of the desired product.

The following are specific examples of the application of the invention to practice. It will be understood that these specific examples are merely illustrative and informative. It is not the intention to limit the invention to the particulars therein given, but to cover by patent all equivalents and also all modifications within the scope of the hereto appended claims.

EXAMPLE 1.—*Puffed yellow corn product*

(a) 100 pounds of No. 4 yellow corn grits (containing ordinarily 10%–12% moisture) are subjected for about 15 to 30 minutes to from 15 to 25 pounds steam pressure per square inch. The operation can be performed in a rotary steam cooker but the grain is not cooked, insufficient water being present for cooking. The steam is dry steam and the exhaust from the steaming operation is preferably left wider open than is customary in the steam cooking of grain, so that after contact with the corn the steam escapes with extracted volatiles without condensing to any great extent on the material. This treatment removes the strong or "corny" taste from the yellow corn grits.

(b) To the corn grits, thus treated, is added thirty pounds of water which is introduced into the grits with tempering, preferably, in such manner as to insure the complete penetration of the grain particles by the water and the even distribution of the water, not only through the grain as a mass but throughout each kernel so that there will be no raw centers after the cereal has been cooked. This can be effected by introducing the water, all at one but, preferably, a little at a time, into the grain in a rotary cooker which latter is revolved for from six to twenty-four hours, depending upon the size of the grits, but in any case until there has been an even penetration of the moisture throughout the material. No heat is applied so that the operation is a water absorption process but involves no cooking of the material. The particular method of distributing the water through the grain is not important so long as complete penetration and even distribution of the moisture is accomplished. The treatment in the rotary apparatus may be followed by tempering, that is, allowing the material to stand for several hours; or tempering may be effected between intervals of agitation or stirring, which is necessary in order to get proper distribution and prevent fermentation. In warm weather air may be blown through the material.

(c) The corn is then cooked, preferably under steam pressure, for example, fifteen pounds pressure per square inch, in a rotary cooker, without the addition of water; although if needed or desired, some water may be added. The cooking time may vary from five minutes to twenty-five minutes, but, in any case, it will be considerably shorter than the customary period which is about an hour.

(d) The cooked material is then "bumped," that is, compressed or impacted in such manner, for example, by passing through rolls set at such a distance apart that the internal structure of the grain is altered, with some possible deformation or flattening, but without reducing the grits to flakes, such as are rolled from grits in the production of corn flakes. With the moisture added during the absorption treatment and with no moisture added in the cooking, it will not be necessary, ordinarily, to partially dry the grain after cooking and before bumping, as has been customary. This saves one step of the process and improves the bumping effect because the material can be passed through the bumping rolls while hot.

(e) The bumped grits are then dried to about 10% to 15%, preferably to 12%, moisture.

(f) The material is then, preferably, tempered for twelve hours, more or less, to assure uniform redistribution of the moisture in case the drying out of the moisture in any precedent step has not been carried out uniformly.

(g) The material is then explosively puffed in the usual manner. The gun pressure may be about 175-180 pounds per square inch and the gun may be revolved for about seven minutes after charging and before release.

This process gives a product which in texture, flavor and crispness is an improvement upon puffed corn as heretofore made.

EXAMPLE 2.—*Puffed corn product*

The process is the same as in Example 1 except that the cereal is flavored as follows: In the moisture absorption treatment there is added to the 30 pounds of water 4 pounds of sugar, 4 pounds of malt syrup and 2 pounds of salt. The solution is poured over 100 pounds of corn grits as described in Example 1 (b).

I claim:

1. Process of treating yellow corn grits in the production of a puffed product which comprises: subjecting the grits to dry steam at 15 to 25 pounds pressure per square inch for about 15 to 30 minutes; introducing into the material, without heating, about 30 parts of water to each 100 parts, by weight, of the corn, and agitating and tempering the material until complete penetration and uniform distribution of the water has taken place; cooking the material at about 15 pounds steam pressure per square inch for from 5 to 25 minutes; bumping the material; drying the bumped grits to a moisture content of about 10% to 15%; and then explosively puffing the same.

2. Process of treating yellow corn grits in the production of a puffed product which comprises: subjecting the grits to dry steam to remove the strong taste therefrom; adding unheated water slowly to the grits while agitating them until there has been about 30 parts of water added to each 100 parts by weight of corn grits and continuing the agitation until there is obtained complete penetration of the grits; tempering the grits to assure uniform distribution of moisture therein; cooking the grits under steam pressure without the addition of water; bumping the grits while still hot and without drying them; drying the material to about 10 to 15 per cent moisture content; further tempering the grits to assure uniform distribution of the remaining moisture content; and then explosively puffing the same.

3. Process of treating corn grits in the production of a puffed product which comprises: adding unheated water slowly to the grits while agitating them until there has been added about 30 parts of water to each 100 parts by weight of corn grits and continuing the agitation until there is obtained complete penetration of the grits; tempering the grits so treated to assure uniform distribution of the moisture; cooking under steam pressure without additional water; bumping the grits while still hot and without drying; drying the material to about 10 to 15 per cent moisture content; tempering the material to assure uniform distribution of the remaining moisture; and then explosively puffing the same.

JOHN L. KELLOGG.